March 7, 1961  A. L. BAULING ET AL  2,973,946
MIXING APPARATUS

Filed July 29, 1958  2 Sheets-Sheet 1

March 7, 1961 A. L. BAULING ET AL 2,973,946
MIXING APPARATUS
Filed July 29, 1958 2 Sheets-Sheet 2

United States Patent Office 2,973,946
Patented Mar. 7, 1961

2,973,946

MIXING APPARATUS

Adrianus L. Bauling, Deventer, Netherlands, and David T. Milne, Fredericksburg, Va., assignors to American Viscose Corporation, Philadelphia, Pa., a corporation of Delaware Filed July 29, 1958, Ser. No. 751,722

2 Claims. (Cl. 259—111)

The present invention relates to an apparatus for mixing, dissolving, comminuting, etc. a wide variety of materials and is particularly useful for processing viscous or thixotropic liquids or solutions and suspensions containing hard to dissolve solid particles.

Conventional machines for mixing, comminuting, dissolving and like processes generally operate on the principle that the greater and more vigorous the mechanical agitation, the more marked the resultant effect. This, of course, is true of a great many materials. However, there are large classes of materials where vigorous action and the attendant heat produced is decidedly detrimental to the attainment of uniform mixing, comminution, dissolution and the like, and it is with the processsing of these classes of materials that the present invention is particularly concerned. Examples of such materials are very viscous liquids such as cellulose acetate, thixotropic liquids such as aqueous solutions of sodium carboxymethyl cellulose, suspensions or dispersions of clay, pigments, pulp slurries, certain foodstuffs such as peanut butter, ice cream, and, in fact, a very great many other materials requiring a certain amount of crushing, stretching, kneading, squeezing, or other physical distortion during their processing.

The present invention contemplates an apparatus for processing materials of the type noted above wherein a rotor element is mounted for both rotation and revolution or orbiting movement within a closed vessel through which the material to be acted upon is passed in a continuous operation. As the rotor revolves and rotates, the material passing through the vessel is alternately subjected to stress and then relaxed as it is pinched between the roller and the inside of the vessel. The apparatus is provided with heat exchange means in the form of a circulatory system within the rotor and also within the vessel whereby the temperature of the material being processed may be raised or lowered and fairly precisely controlled in accordance with the particular material being acted upon. In general, this invention constitutes an improvement over the apparatus shown in the patent to Pratt et al., No. 2,238,864.

It is the principal object of this invention to provide an apparatus of the type referred to above wherein the path of revolution of the rotor may be selectively varied to meet the requirements of the particular material being acted upon.

Other and further objects, features, and advantages of the invention will become apparent as the description of a preferred embodiment thereof proceeds.

Referring now to the drawings.

Figure 1:
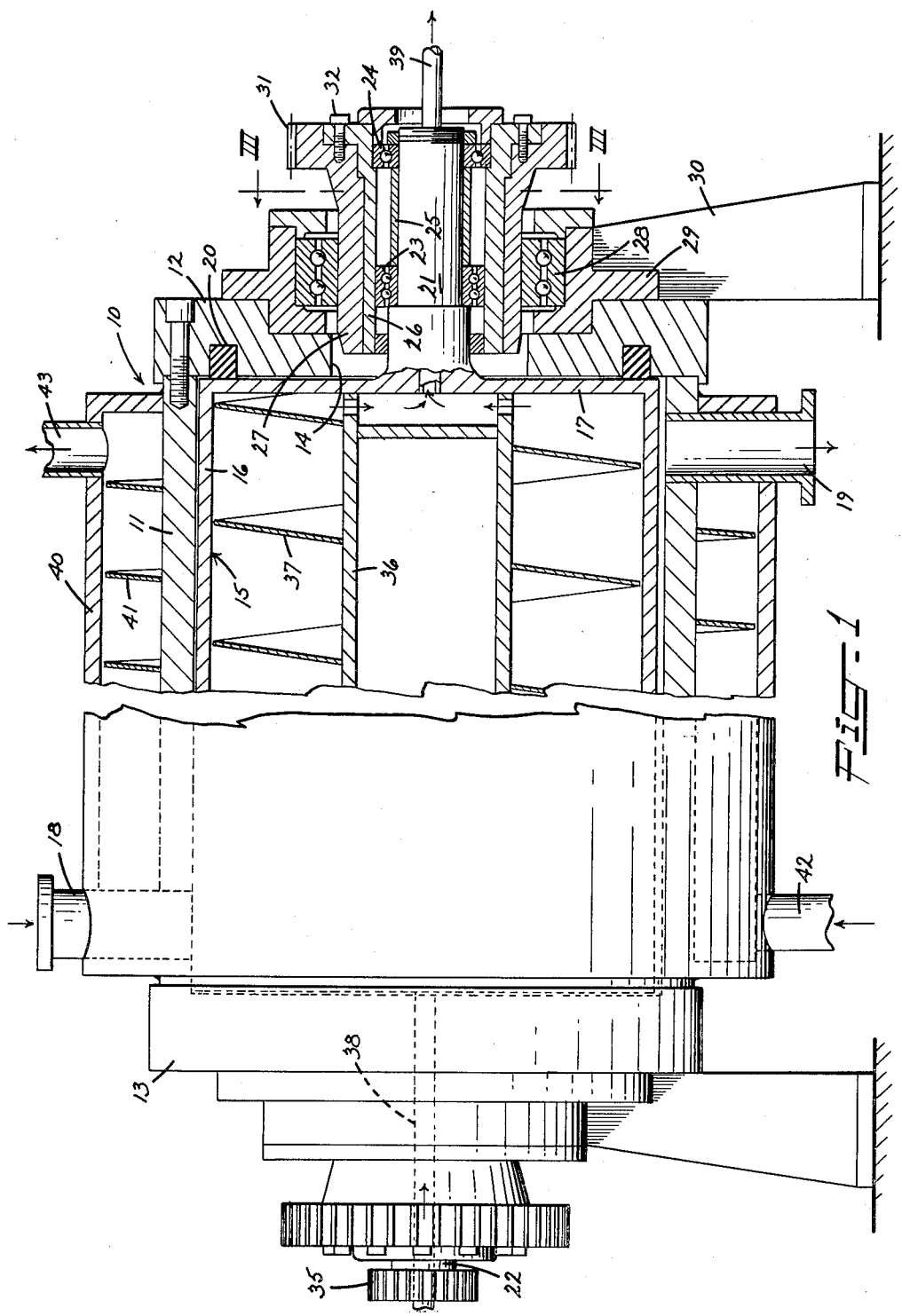
Figure 1 is a view of the apparatus partially in side elevation and partially in cross-section.
Figure 2:
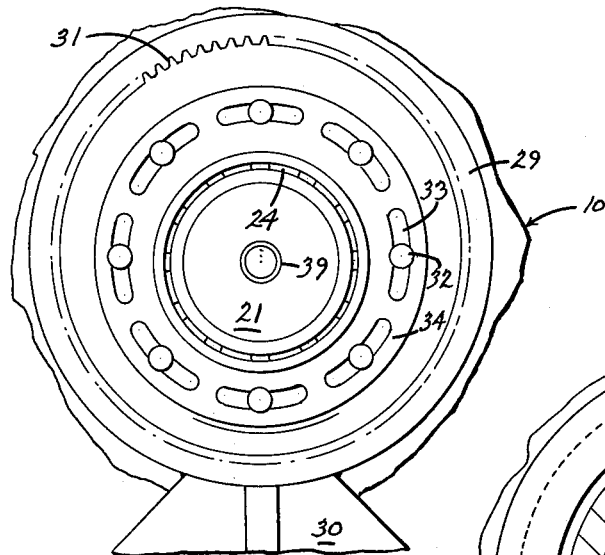
Figure 2 is an end view showing one of the mountings for the rotor.

In general, the apparatus comprises a vessel 10 having a cylindrical shell 11 closed by end walls 12 and 13 each of which is provided with an enlarged axial opening 14. A cylindrical rotor generally designated at 15 is mounted for rotation and revolution within the vessel 10 in a manner presently to be described. The rotor 15 comprises a cylindrical outer wall 16 and end walls 17, the latter of which are located in close proximity to the end walls of the vessel. As shown in Figure 1 the outer diameter of the rotor 15 is only slightly smaller than the internal diameter of the vessel 10. Instead of cylindrical, the operative surfaces of the vessel and rotor could be conical or frusto-conical.

The vessel is provided with an inlet port 18 by way of which the material to be processed may be continuously introduced and with an outlet port 19 for continuously discharging the processed material from the vessel. As will presently be explained, the path of revolution or orbital movement of the rotor may be varied so that the material may be subjected to the type of action best adapted to produce the results desired for the particular material. As the rotor revolves, the material which is in the apparatus is alternately subjected to stresses and then relaxed as it moves within the space where the surface of the rotor is close to the internal surface of the shell 11 such as shown at the top of Figure 1 and the space where the surface of the rotor is more removed from the internal surface of the shell as shown at the bottom of Figure 1. The rotor is so proportioned that along the line where it is farthest removed from the shell 11, very little if any work is performed upon the material in the vessel. If the rotor is rotated in the same direction in which it revolves, the material being acted upon will be subjected to shear along the line where the rotor is closest to the inside of the vessel, whereas if the rotor is caused to rotate in the opposite direction to that in which it is revolving the material will be subjected to more of a crushing action as it passes between the rotor and the vessel. In order to prevent the material being processed from escaping through the enlarged axial openings 14, sealing means in the form of a ring 20 mounted in each end wall of the vessel is provided between the ends of the vessel and the ends of the rotor.

The means for mounting the rotor for revolution and rotation comprises axial shafts 21 and 22 secured to the rotor and extending outwardly through the enlarged axial openings 14 of the vessel. Inasmuch as the shafts 21 and 22 are mounted in the same manner, only the mounting of the shaft 21 will be described in detail. The shaft 21 is supported in two sets of roller bearings 23 and 24 held spaced apart by a sleeve 25. The bearings 23 and 24 are mounted in the internal cylindrical surface of a sleeve 26 which is one of a pair of telescoped sleeves the outer of which is indicated at 27. The sleeve 27 is rotatably mounted in roller bearings 28 supported in a casing 29 secured to the end wall 12 of the vessel and carried by a support 30. The sleeve 27 is provided with gear teeth 31 by means of which it is rotated from a conventional drive, not shown.

The bearing engaging surface of the sleeve 27 is mounted concentrically of the axis of the vessel whereas the inner surface of the inner sleeve 26 is eccentric with respect to the axis of the vessel and the two sleeves are secured together by means of bolts 32 so that rotation of the outer sleeve 27 causes the shaft 21 and the rotor 15, to which said shaft is secured, to revolve or orbit about the axis of the vessel.

Figure 3:
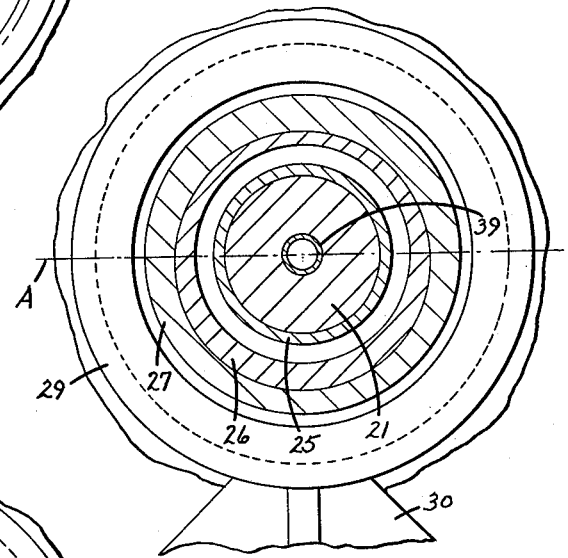
Figure 3 is a sectional view taken along the line III—III of Figure 1.
Figure 4:
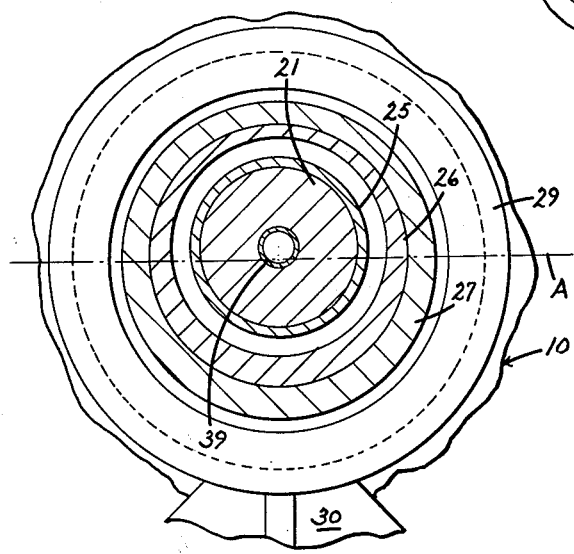
Figure 4 is a view similar to Figure 3 and showing the adjustable rotor bearing in a differently adjusted position.

As best seen in Figures 3 and 4, the mating surfaces of the telescoped sleeves 26 and 27 are eccentric both with respect to the internal surface of the sleeve 26 and the external surface of the sleeve 27. In Figures 3 and 4 the horizontal axis of the vessel 10 is indicated by the broken line A and it will be observed that the eccentricity of the shaft 21 may be varied by relatively rotating the sleeves 26 and 27. The bolts 32 securing the sleeves 26 and 27 together pass through slots 33 of a flange 34 of the sleeve 26 so that by loosening the bolts 32 it is possible to rotate either the sleeve 26 or the sleeve 27 to a limited extent with respect to the other to thereby produce a small change in the eccentricity of the shaft 21. If it is desired to change the eccentricity of the shaft to a greater extent than permitted by the slots 33, the bolts 32 may be entirely removed and replaced after the necessary relative rotation of the sleeves has been brought about.

It has been previously mentioned that the rotor 15 both revolves and rotates and to accomplish the rotation, the shaft 22 of the rotor has secured thereto a toothed wheel 35 which is driven through either a toothed belt or a chain so that the slightly eccentric movement or revolution of the shaft will not interfere with the drive. The rotor may be rotated either in the same or the opposite direction as that in which it revolves, depending upon the type of action to which it is desired to subject the material being processed.

Since it is contemplated that the apparatus will be used for the processing of a wide variety of materials, some of which should be kept cool or even chilled or frozen during their time within the apparatus and others of which it is desired to heat while in the apparatus, heat exchange means is provided. To this end, the rotor 15 is provided internally with a closed ended cylindrical partition 36 and the space between the partition 36 and the outer cylindrical wall 16 of the rotor has situated therein a spiraled partition 37. Cooling or heating medium is introduced into the rotor through a tube 38 extending through the axis of the shaft 22 and passes spirally through the rotor due to the spiraled partition 37 and thence passes outwardly through an axial tube 39 extending through rotor shaft 21. The tubes 38 and 39 are connected by means of commercially known rotatable fluid couplings to flexible fluid conduits which permit the rotor shafts to revolve as well as rotate. The vessel 10 is provided with a jacket 40 and the space between the jacket and the cylindrical shell 11 is divided by a spiraled partition 41. Cooling or heating liquid is supplied to the space between the jacket and the shell through a pipe 42 and passes spirally around the surface of the shell and discharges through a pipe 43.

The heat exchange action of this machine depends on constantly changing the material in contact with the heat exchange surfaces and also constantly wiping the heat exchange surfaces clean. With each revolution of the rotor, the entire inside surface of the shell 11 is wiped clean continuously and other materials brought in contact with it. The same is true of the outside surface of the rotor with each rotation of the rotor. Thus, the material in contact with the shell and rotor surfaces is changed constantly. The two effects of cleaning the surfaces and bringing new material in contact with them insures very high heat exchange efficiency.

This machine is admirably suited to dispersing fiber agglomerates, clumps, gels, etc. of substances like nitrocellulose or cellulose acetate in organic solvents, cellulose xanthate or methyl cellulose in dilute aqueous alkalies, etc. Agglomerations of such materials usually are coated with thick jellies which prevent the solvent from acting upon the unwet or undissolved portions or lumps. This machine squeezes and rubs such agglomerates and forces the solvent to act upon them in such a way that their dispersion is accomplished. On the other hand, when conventional machines are used, such agglomerations can actually be pumped through screens or attrition mills and be temporarily cut or sheared apart only to re-form when the screen or blade no longer comes between the portions of the agglomerates.

The mechanical action of the device upon the material being processed is that of masticating, that is, of grinding, chewing, crushing, kneading, mixing, squeezing, folding, stretching, tearing, shearing, etc.

Materials passing through the machine travel in an interrupted spiral path. As the rotor rotates and revolves, its outside surface approaches the inside surface of the shell 11 and the more viscous or lumpy portions of the material being treated are trapped between the rotor and shell where they are subjected to tremendous crushing and kneading action. As previously mentioned, crushing is at a maximum when the directions of rotation and revolution are in opposition and shearing is at a maximum when the directions of rotation and revolution are the same.

It may be pointed out that the machine is well suited to the freezing of ice cream, sherbets, ices, and vegetable oil emulsions marketed as "frozen custard" etc. where the formation of relatively large ice crystals or "grains" is to be avoided. The unique action of this machine provides for dispersing ice as quickly as it is formed. A similar situation exists with the formation of meat emulsions from ground meat, fat, cereal and ice, etc. for making certain types of linked sausages either batchwise or continuously.

Having thus described a preferred embodiment of the invention, what is claimed is:

1. Apparatus of the type described comprising a fixed outer cylindrical container having end walls having axial openings therein, a cylindrical rotor positioned within said container, said rotor having an outside diameter only slightly smaller than the inside diameter of said container, axial shafts fixed to said rotor and extending outwardly from the ends thereof and through the axial openings in the end walls of said container, said shafts fitting loosely within said axial openings, means for preventing material placed in said apparatus from escaping through said axial openings, mounting means mounting said shafts for rotation and revolution, said mounting means each comprising a pair of telescoped sleeves each of which has a right circular cylindrical bore which is eccentric with respect to the outer right circular cylindrical periphery thereof, means for locking the sleeves of each pair together in a plurality of relatively rotated positions whereby the eccentricity of the bore of the inner sleeve may be varied with respect to the outer periphery of the outer sleeve, bearing means rotatably supporting one of the axial shafts of the rotor within the bore of each inner sleeve, bearing means rotatably supporting each outer sleeve, means for rotating said outer sleeves whereby said rotor is caused to revolve within said container, and means independent of said last-named means for rotating selectively in opposite directions one of said axial shafts and the rotor to which the shaft is connected.

2. Apparatus of the type described comprising a fixed outer cylindrical container having planar end walls with enlarged axial openings therein, a cylindrical rotor positioned within said container, said rotor having an outside diameter only slightly smaller than the inside diameter of said container and having planar end walls located closely adjacent the end walls of said container, sealing means between the end walls of said container and the end walls of said rotor to prevent the escape through the enlarged axial openings of material placed in said container, axial shafts fixed to said rotor and extending outwardly from the ends thereof and through the enlarged axial openings in the end walls of said container, said shafts fitting loosely within said axial openings, mounting means mounting said shafts for rotation and revolution, said mounting means each comprising a pair of telescoped sleeves each of which has a right circular cylindrical bore which is eccentric with respect to the outer right circular cylindrical periphery thereof, means for locking the sleeves of each pair together in a plurality of relatively rotated positions whereby the eccentricity of the bore of the inner sleeve may be varied with respect to the outer periphery of the outer sleeve, bearing means rotatably supporting one of the axial shafts of the rotor within the bore of each inner sleeve, bearing means concentric with the axis of said container rotatably supporting each outer sleeve, means for rotating said outer sleeves whereby said rotor is caused to revolve within said container, and means independent of said last-named means for rotating selectively in opposite directions one of said axial shafts and the rotor to which the shaft is connected.

References Cited in the file of this patent

UNITED STATES PATENTS

| | | |
|---|---|---|
| 276,292 | Seymour | Apr. 24, 1883 |
| 936,060 | Viedt | Oct. 5, 1909 |
| 2,238,864 | Pratt et al. | Apr. 15, 1941 |
| 2,579,239 | Lippmann | Dec. 18, 1951 |
| 2,712,923 | Wynne | July 12, 1955 |
| 2,820,596 | Broman | Jan. 21, 1958 |

FOREIGN PATENTS

| | | |
|---|---|---|
| 161,632 | Germany | June 26, 1905 |